United States Patent [19]

Becker et al.

[11] 4,399,268

[45] Aug. 16, 1983

[54] PROCESS FOR PREPARING MOULDED BODIES AND COATINGS

[75] Inventors: Wilhelm Becker, Hamburg; Herbert Hübner, Burgkirchen; Manfred Marten, Hamburg, all of Fed. Rep. of Germany

[73] Assignee: Hoechst Aktiengesellschaft, Fed. Rep. of Germany

[21] Appl. No.: 276,687

[22] Filed: Jun. 23, 1981

[30] Foreign Application Priority Data

Jun. 24, 1980 [DE] Fed. Rep. of Germany ....... 3023464

[51] Int. Cl.$^3$ .................... C08G 59/50; C08G 59/62
[52] U.S. Cl. .................................. 528/99; 525/490; 528/100; 528/103; 528/107
[58] Field of Search ................ 528/99, 103, 107, 100; 525/490

[56] References Cited

U.S. PATENT DOCUMENTS

| | | | |
|---|---|---|---|
| 3,870,666 | 3/1975 | Becker | 528/162 X |
| 3,950,451 | 4/1976 | Suzuki et al. | 528/107 X |
| 4,129,556 | 12/1978 | Zondler et al. | 528/99 X |
| 4,269,742 | 5/1981 | Goeke et al. | 528/99 X |

*Primary Examiner*—Earl A. Nielsen
*Attorney, Agent, or Firm*—Hammond & Littell, Weissenberger and Muserlian

[57] ABSTRACT

A process for the preparation of molded bodies and coatings which comprises reacting at least one epoxy compound containing more than one 1,2-epoxy group per molecule alone or in combination with at least one monoepoxide, with at least one substituted amine of formula

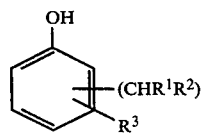 (I)

which contains no free phenols and in which
$R^1$ is hydrogen or methyl,
$R^2$ is a radical of at least one formulae

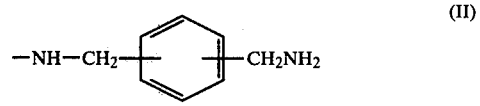 (II)

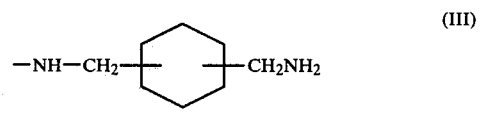

(III)

and
$R^3$ is hydrogen, a hydroxy group, a carboxylic group or methyl, said amine (I) having been obtained by reaction of a substance selected from the group consisting of at least one xylylenediamine, and hydrogenation product thereof in the form of bis-(aminomethyl)-cyclohexanes according to one of the following processes with (a) a hydroxybenzaldehyde or a hydroxyacetophenone in a first step to form a Schiff's base and followed by a hydrogenation of said base in a second step to form a compound of formula (I), (b) a dimethylaminomethylphenol being free from phenols or with the corresponding cresol derivative or with at least one Mannich base, containing no free phenols, but derived from at least one phenol, formaldehyde and such primary monoamines, the aliphatic α-carbon atom of which is bound to at least two aliphatic carbon atoms of hydrocarbon groups, and/or substitution products thereof the substituent of which is inert towards the reaction, the dimethylamine or the primary monoamine component of the Mannich base being to a large extent or completely split off, to yield a compound of formula (I), and (c) with at least one phenol-hexamethylenetetramine condensation product of at least one of formulae

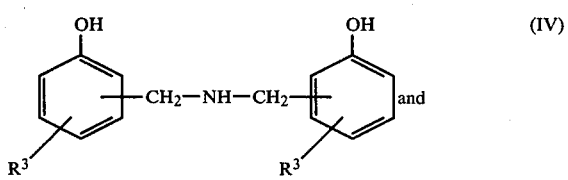 (IV)

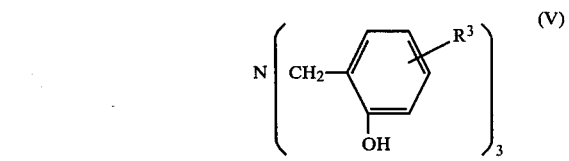

(V)

said products containing no free phenols, to form a compound of formula (I) under splitting off ammonia.

6 Claims, No Drawings

PROCESS FOR PREPARING MOULDED BODIES AND COATINGS

It is known to use aliphatic or cycloaliphatic amines, such as triethylenetetramine, isophorone diamine, m-xylylenediamine or 2-aminoethylpiperazine, either unmodified or in the form of epoxide adducts, together with liquid epoxy resins based on aromatic or aliphatic substances, as solvent-free paint or coating systems. Products of this kind are commercially available and may also contain modifying agents (low molecular mono- or diglycidyl compounds and accelerators) in order to obtain optimum processing characteristics. The paints or coatings are cured at temperatures of from 10° to 30° C.

The paints obtained are stable in colour, but have poor technical coating properties and poor resistance to chemicals. In particular, there are highly detrimental effects on the film surface when it hardens in a temperature range of from 10° to 30° C. and in the presence of moisture from the air and $CO_2$. In addition to a reduction in gloss, there is a formation of haze, and "flushing" and sweating occur, which make it impossible to use these hardeners for a number of applications. Systems of this kind are also unsuitable for the production of coatings which are to come into contact with foodstuffs, since the amine-based hardeners do not impart sufficient resistance to organic acids (e.g. fruit juices) to the epoxy resin coatings.

Certainly, the addition of phenols, e.g. alkylphenols, or compounds containing methylol groups, to the above mentioned systems can result in some improvements, of which the better quality surface of the film should be particularly emphasised. However, the short potlife of the mixtures, on the one hand, and the resistance of the films produced to organic acids, aqueous agents and alcoholic solutions, on the other hand, remain unsatisfactory. In fact, these solvents release constituents of the film, particularly the phenols added as accelerators, thus making it impossible to use these systems in the food sector.

In addition to the high reactivity and the resultant short potlife mentioned hereinbefore, the inherent viscosity of these hardeners is also a disadvantage.

It is also known to activate diamines, which are used as cross-linking agents for epoxide compounds, e.g. ethylenediamine, diethylenetriamine, triethylenetetramine, tetraethylenepentamine or cycloaliphatic diamines, by condensing them together with phenols and aldehydes or by reacting 3,3,5-trimethyl-5-aminomethylcyclohexylamine, for example, with phenol-aldehyde reaction products. Although these condensation products result in some improvements compared with the simple activation of the polyamines by mixing them with phenols, they do not satisfy all the requirements.

The coatings prepared with these known crosslinking agents with epoxy resins based on bisphenol A are also prone to considerable damage from organic acids or form a white deposit when wetted with water. Moreover, the mechanical properties of the cured epoxy resin compositions are unsatisfactory.

From German OLS No. 2 612 211 and German ALS No. 2 025 159, it is also known that, by reacting aliphatic amines with formaldehyde and phenol, it is possible to synthesise amine hardeners which, when mixed with epoxides, produce films having good resistance to organic acids and diluted alcohols. However, these hardeners contain free phenol which can also be released from the films by means of solvents, thus making it impossible to use these systems in the food industry.

German ALS No. 20 25 159 describes, as condensation product 8, the preparation of a Mannich base of general formula

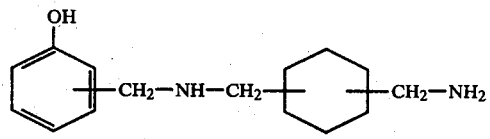

which does not contain any free phenol and which, when dissolved as a 35% by weight solution in 4,4'-diamino-3,3'-dimethyl-cyclohexylmethane, can be used as a crosslinking agent for epoxy resins. This compound can be used in the food sector, thanks to the absence of phenol. However, owing to the small proportion, 2.4% by weight, of phenolic hydroxide groups in this solution of Mannich base and amine, curing is a very slow process, particularly at low temperatures.

Moreover, according to German OLS No. 28 23 682, it is known to use reaction products prepared from Mannich bases and polyamines with amine exchange and splitting off of secondary amine, as hardening agents. These hardening agents are reaction products of polyamines or aromatic amines with Mannich bases obtained from formaldehyde, phenols and secondary amines. Since they only contain phenol in bound form, they can be used to some extent for coatings based on epoxy resins in the food sector. However, coatings of this kind are soon destroyed even by dilute aqueous solutions of organic acids, such as formic acid, acetic acid or lactic acid.

The aim of this invention is to provide hardeners which are both free from unbound phenol and also have excellent resistance to chemicals, particularly to organic acids.

Surprisingly, a process for the preparation of moulded bodies and coatings has now been found, which comprises reacting at least one epoxy compound having more than one 1,2-epoxy group per molecule, which may optionally be in combination with at least one monoepoxide, with at least one substituted amine of general formula

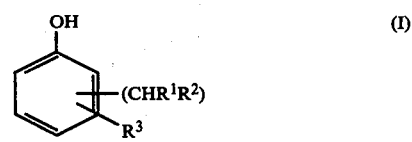

wherein
$R^1$ represents H or $CH_3$,
$R^2$ represents

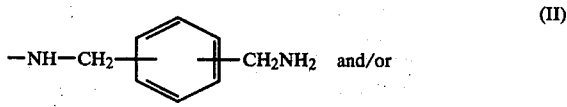

and/or

-continued

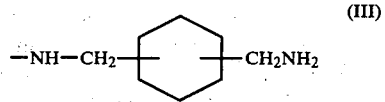
(III)

and
R³ represents H—, HO—, HOOC— or CH₃—,
which is characterised in that said amines of formula (I) contain no free phenols and have been prepared by reacting xylylenediamine or a mixture of isomers thereof and/or the hydrogenation products thereof in the form of bis-(aminomethyl)cyclohexanes according to one of the following processes, with
(a) a hydroxybenzaldehyde or hydroxyacetophenone in a first step to form a Schiff's base, which is then hydrogenated in a second step to form a compound of formula (I),
(b) a phenol-free dimethylaminomethyl-phenol or -cresol or with at least one Mannich base, containing no free phenols, but derived from at least one phenol, formaldehyde and such primary monoamines, the aliphatic α-carbon-atom of which is bound to at least two aliphatic carbon atoms of hydrocarbon groups, and/or substitution products thereof the substituent of which is inert towards the reaction, the dimethylamine or the primary monoamine component of the Mannich base being to a large extent or completely split off, to yield a compound of formula (I), and
(c) with at least one phenol-hexamethylenetetramine condensation product of formulae

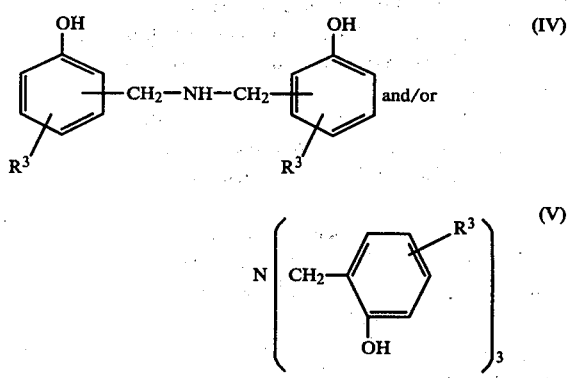

which contain no free phenols, to form a compound of formula (I) by splitting off ammonia.

Coatings having outstanding resistance to chemicals can be prepared by the processes according to the invention.

In particular, the amine hardeners may be prepared as follows, for example:

PROCESS (a)

Reaction to form the Schiff's base and subsequent hydrogenation, e.g. with Raney nickel in methanolic solution at 50 to 100 bar H₂ to form the Mannich base according to reaction scheme A (see formula sheet, equations (1)–(2) and (3)–(4)).

Instead of Raney nickel, it is also possible to use platinum-hydrogen, palladium-hydrogen, lithium aluminium hydride, a borohydride, such as NaBH₄ or the like.

PROCESS (b)

This reaction proceeds according to scheme B (see formula sheet, equations (5)–(6)), while considering that in the case of the Mannich base the group

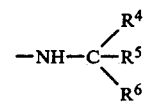

is present instead of the group —N(CH₃)₂.

PROCESS (c)

Reaction scheme C (see formula sheet, equations (7) and (8)).

In reaction (a), the following may be used, for example, as hydroxybenzaldehydes and hydroxyacetophenones: o- and/or p-hydroxyacetophenone, other hydroxyphenylmethylketones which may be synthesised in the usual way, preferably salicylaldehyde and/or p-hydroxybenzaldehyde. o-Hydroxyphenylmethylketones are obtained, for example, by acylation of phenols with acid chlorides or anhydrides and subsequent Fries rearrangement D (see formula sheet, equation D)). If there is a hydrogen (R³=H) in the p-position relative to the OH group, in addition to the Schiff's bases of the o-hydroxyphenylalkylketones, the corresponding p-hydroxyphenylalkylketones may also be formed.

R¹ and R³ are as hereinbefore defined.

Reaction (b) may be carried directly at an elevated temperature of from 100° to 200° C. or under the same conditions in an organic solvent being inert under the reaction conditions such as cyclohexane, tetrahydrofurane and especially toluene or xylene.

Suitable primary monoamines are for example those containing at the α-carbon atom a branched alkyl group or a cycloalkyl group, and/or its substitution products, the substituents being alkyl-, hydroxy- or ether group of aliphatic monohydric alcohols, each alkyl groups always having from 1 to 5 carbon atoms. Such monoamines have the structural formula

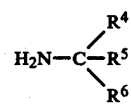

in which R⁴ to R⁶ represent equal or different alkyl groups having from 1 to 5 carbon atoms with a proviso that one of the groups R⁴ to R⁶ may also be hydrogen and in this case the two other groups together may form an alkylene group of 4 to 6 carbon atoms, thus forming a cycloalkylene group. Suitable amines are for example isopropylamine, sec. butylamine, t-butylamine, t-amylamine, t-hexylamine, t-heptylamine, t-octylamine, t-nonylamine, t-decylamine, cyclopentylamine, cyclohexylamine, 2-aminobutanol-1, 4-methyl-4-aminopentanol-2 and 1-methoxymethylpropylamine with the proviso that t-heptylamine and the amines of more than 7 carbon atoms have a structure such that no group has more than 5 carbon atoms. Preferred amines are t-butylamine and t-amylamine.

In reaction (c), the compounds of formulae (IV) and/or (V) used in the reaction are obtained by condensation of phenols with hexamethylenetetramine, e.g. in a molar ratio of 3:1 to 6:1, preferably (3.4 to 4.5):1 in a temperature range of from 130° to 190° C., in a pressure vessel. The non-bound phenol is removed from the resultant mass, which may possibly be ground or dissolved in solvent, by extraction with water. As phenols, it is also possible to use diphenols and/or phenolcarboxylic acids, e.g. resorcinol, hydroquinone, salicylic acid and/or p-hydroxyphenylcarboxylic acid. Preferably, in all three processes, m-xylylenediamine and the mixtures of isomers thereof or the hydrogenation products thereof are used as starting materials.

The purified condensates obtained are conveniently reacted in a corresponding molar ratio with the diamine at temperatures of 100° to 200° C., preferably 120° to 160°, more particularly 130° to 150° C., directly or, under the same temperature conditions, in an organic solvent such as toluene or xylene according to reaction (c) to form the Mannich bases, with the release of ammonia.

The condensation of the phenols, diphenols and/or phenol carboxylic acids with hexamethylenetetramine may also be carried out directly with xylylenediamine and/or the hydrogenation products thereof at elevated temperatures of from 100° to 200° C., preferably 120° to 160° C., with reactions (7) and (8) occurring one after the other, with the splitting off of ammonia.

The method according to the invention, unlike those of the prior art, makes it possible to obtain products having a minimum content of phenolic OH groups of 6.3, preferably of more than 6.7% by weight. Such an especial high content of phenolic OH groups is desirable in the manufacture of coatings, more particularly for use in the food industry, e.g. for food cans, owing to the high resistance to chemicals, particularly organic acids. The invention therefore makes it possible for the first time to produce moulded bodies and coatings having excellent resistance to chemicals. In addition, they still have a high gloss. The fact that the Mannich bases used as hardeners do not contain any free phenols is particularly favourable for use of these products in the food industry. A further advantage is that the epoxy compounds can be cured even at low temperatures.

Epoxy resins include, for example, those having a viscosity of 2000 to 40,000, preferably 5000 to 15,000 mPa.s/25° C., such as diglycidyl ethers based on diphenylolpropane and -methane, glycidyl ethers of phenolformaldehyde condensates (epoxy novolaks), either individually or in admixture, and mixed with glycidyl ethers of aliphatic mono- or polyhydric alcohols such as n-butanol, 2-ethylhexanol, butanediol, pentaerythritol or phenols or alkylphenols such as o-cresol or p-tert-.butylphenol, glycidyl esters of phthalic acid, hexahydrophthalic, tetrahydrophthalic acid.

The coating compositions containing the amines obtained according to the invention may contain conventional organic and/or inorganic pigments for colouring and other conventional additives, such as thixotropic agents, e.g. pyrogenic silicic acid, coating additives, such as flow agents, dispersing agents and anti-settling agents. They may also contain solvents such as lower alcohols, toluene, xylene, benzylalcohols, ketones or flexibilisers such as phthalic acid esters of monohydric alcohols, e.g. n-butanol, amylalcohol, 2-ethylhexanol, nonanol, benzyl alcohol either individually or in admixture, γ-butyrolactone, δ-valerolactone, ε-caprolactone, lower and higher molecular weight polyols, e.g. glycerol trimethylol-ethane or -propane, ethyleneglycol and ethoxylated or propoxylated polyhydric alcohols and crosslinking accelerators.

Advantageously, the substituted amines are used as hardeners in amounts equivalent to the epoxide groups contained in the epoxy resin, but in many cases an excess of up to 50 mol-% is possible. It should be emphasised that crosslinking occurs with the new crosslinking agents even at low temperatures of 0° C., for example, and possibly even at −5° C. Curing may also be effected in the presence of considerable humidity in the air and, in some cases, even under water.

The crosslinked epoxy resin plastics obtained have excellent resistance to water, acids and chemicals, whilst having good surface gloss and very good elasticity. Moulded bodies may also be cured, according to the invention, in the form of laminates, adhesives or cementing materials and coating, lining and repair material for concrete flooring and concrete pipes. They may also contain the reaction products according to the invention as synthetic resin cements.

The invention is illustrated by the following non-limiting Examples, in which, % represents % by weight.

EXAMPLES (I) Preparation of the amine hardeners 1 to 4 according to process (a) and comparison 5V with process (a)

The Schiff's bases were prepared from molar quantities of (1) Salicylaldehyde and m-xylenediamine,
(2) p-Hydroxybenzaldehyde and m-xylylenediamine,
(3) p-Hydroxyacetophenone and m-xylylenediamine,
(4) p-Hydroxybenzaldehyde and a mixture of isomers consisting of 1,3- and 1,4-bis(aminomethyl)cyclohexane and
(5V) p-Hydroxybenzaldehyde and triethylenetetramine.

For this, the amines were placed in a 3-necked flask fitted with a water separator, and then 20% of toluene was added, based on the total quantity of amine/aldehyde. The aldehyde was added with cooling and stirring. With the toluene being recycled, in a circulating reaction carried out at elevated temperature, 1 mol of $H_2O$ was separated off per mole of aldehyde. Once the theoretical quantity of water had been removed, the toluene was removed under reduced pressure of about 25 mbar with the temperature being increased to 100° C. The Schiff's bases were obtained as viscous liquids which partially crystallised. The amine numbers were as follows:

| Example | Amine No. found | Theory |
|---|---|---|
| 1 | 465 | 467 |
| 2 | 463 | 467 |
| 3 | 438 | 442 |
| 4 | 452 | 456 |
| 5 (Comparison) | 883 | 895 |

The Schiff's bases were dissolved 1:1 in methanol, mixed with 1.5 to 4% by weight of Raney nickel, based on the solution, and hydrogenated with hydrogen at 80° C. and at 50 to 100 bars until the uptake of $H_2$ had ended. Then the product was filtered off from the catalyst and the solvent was distilled off under reduced pressure until the temperature increased to 100° C.

The Mannich bases were obtained as viscous liquids consisting chiefly of compounds (9) to (12) and (13)V (comparison) (see formula sheet). These formulae correspond in sequence to the products of Examples 1 to 4 and comparison 5.

The Ni content of the Mannich bases 1 to 4 was less than 0.01%, and in the case of the salicylaldehyde derivative it was 0.4%.

The Mannich base obtained from p-hydroxybenzaldehyde/triethylenetetramine contained about 1.5% of Ni.

The content of phenolic OH corresponded to the theoretical amount:

| Example | phenolic OH % | |
|---|---|---|
| | found | theory |
| 1 | 6.91 | 7.02 |
| 2 | 6.95 | 7.02 |
| 3 | 6.59 | 6.64 |
| 4 | 6.83 | 6.85 |
| 5 (Comparison) | 6.62 | 6.75 |

(6) Process (b)

465 g of phenol-free dimethylaminomethylphenol, containing 7.10 mEq of N/g and 6.20 mEq of OH/g, was dissolved in 581 g of toluene and refluxed for 19 hours with 392 g of m-xylylenediamine. The molar ratio of dimethylaminomethylphenol to m-xylylenediamine was 1:0.87. The dimethylamine displaced by m-xylylenediamine was taken up in water. After about 90% of the theoretical quantity of dimethylamine had been split off, the reaction mixture was filtered and freed from toluene by distillation under a reduced pressure of about 25 mbar. A viscous, phenol-free Mannich base was obtained, containing 6.59% of phenolic OH groups and having a hydrogen equivalent weight of 86.

(7) Process (b)

600 g of phenol-free dimethylamiomethylphenol, contaning 7.10 mEq of N/g and 620 mEq of OH/g, were dissolved in 750 g of toluene, then refluxed for 18 hours with 518 g of m-xylylenediamine. The molar ratio of dimethylaminomethylphenol/m-xylylenediamine was 1:1. The dimethylamine displaced by m-xylylenediamine was taken up in water. After about 92% of the theoretical amount of dimethylamine had been split off, the reaction mixture was filtered and freed from toluene by distillation under a reduced pressure of 20 mm Hg. A viscous, phenol-free Mannich base was obtained, containing 6.45% of phenolic OH groups and having a hydrogen equivalent weight of 77.3.

(8) Process (b)

163 g of phenol-free dimethylaminomethylphenol, containing 7.10 mEq of N/g and 6.20 mEq of OH/g, were dissolved in 150 g of toluene and refluxed for 17 hours with 142 g of bis-(aminomethyl)-cyclohexane. The molar ratio of dimethylaminomethylphenol/bis-(aminomethyl)-cyclohexane was 1:1. The dimethylamine displaced by bis-(aminomethyl)-cyclohexane was taken up in water. After about 93% of the theoretical quantity of dimethylamine had been split off, the reaction mixture was filtered and freed from toluene by distillation under a reduced pressure of about 20 mm Hg.

A viscous, phenol-free Mannich base was obtained, containing 6.68% of phenolic OH groups and having a hydrogen equivalent weight of 88.5.

(9) Process (b)

505 g of cresol-free dimethylaminomethylcresol, containing 7.10 mEq of N/g and 6.20 mEq of OH/g, were dissolved in 581 g of toluene and refluxed for 20 hours with 392 g of m-xylylenediamine. The molar ratio of dimethylaminomethylcresol/m-xylylenediamine was 1:0.87. The dimethylamine displaced by m-xylylenediamine was taken up in water. After about 93% of the theoretical amount of dimethylamine had been split off, the reaction mixture was filtered and freed from toluene by distillation under a reduced pressure of about 25 mbar. A viscous, cresol-free Mannich base was obtained, containing 6.3% by weight of phenolic OH groups and having a hydrogen equivalent weight of 94.

(10) Comparison with process (b)

435 g of phenol-free dimethylaminomethylphenol, containing 7.10 mEq of N/g and 6.20 mEq of OH/g, were dissolved in 375 g of toluene and refluxed for 18 hours with 180 g of ethylenediamine. The molar ratio of dimethylaminomethylphenol to ethylenediamine was 1:1. The dimethylamine displaced by ethylenediamine was taken up in water. After about 92% of the theoretical amount of dimethylamine had been split off, the reaction mixture was filtered and freed from toluene by distillation under a reduced pressure of about 25 mbar.

A viscous, phenol-free Mannich base was obtained, containing 9.32% of phenolic OH groups and having a hydrogen equivalent weight of 53.3.

(11) Comparison with process (b)

163 g of phenol-free dimethylaminomethylphenol, containing 7.10 mEq of N/g and 6.20 mEq of OH/g, were dissolved in 150 g of toluene and refluxed for 19 hours with 146 g of triethylenetetramine. The molar ratio of dimethylaminomethylphenol to triethylenetetramine was 1:1. The dimethylamine displaced by triethylenetetramine was taken up in water. After about 91% of the theoretical amount of dimethylamine had been split off, the reaction mixture was filtered and freed from toluene by distillation under a reduced pressure of about 25 mbar.

A viscous, phenol-free Mannich base was obtained, containing 6.58% of phenolic OH groups and having a hydrogen equivalent weight of 53.

(12) Process (c)

94 g (1 mol) of phenol and 35 g (0.25 mol) of hexamethylenetetramine were heated together to 180° C. in a three-necked flask and left at this temperature for 15 minutes. After cooling, the reaction mixture was pulverised and the unreacted phenol and hexamethylenetetramine was removed by repeated washing with H$_2$O. The reaction product, which contained 4.72% of N and 14.63% of phenolic OH, was mixed with 110 g of m-xylylenediamine and refluxed until the production of ammonia ceased.

A viscous, phenol-free Mannich base was obtained, containing 6.75% of phenolic OH groups and having a hydrogen equivalent weight of 81.5.

(13) Process (c)

Example 11 was repeated, using 108 g of o-cresol instead of the phenol. The reaction product of o-cresol and hexamethylenetetramine contained 4.25% of N and 12.86% of phenolic OH groups. The phenol-free Mannich base isolated contained 6.51% of phenolic OH groups and had a hydrogen equivalent weight of 84.5.

(14) Process (c)

163 g of m-xylylenediamine were placed in a three-necked flask fitted with a stirrer, reflux condenser and thermometer and 113 g of phenol followed by 28 g of hexamethylenetetramine were added, with stirring. Then a nitrogen current was passed over the reaction mixture and this current was passed through the reflux condenser into a gas header with 7 N sulphuric acid in order to absorb the ammonia. The mixture was then heated to 140° C. over 45 minutes and kept at this temperature for 4 hours. The quantity of ammonia expelled was 13.6 g. Then 77 g of m-xylylenediamine were added, the temperature was reduced to 105° C. and 55 g of salicylic acid and 9.4 g of hexamethylenetetramine were added. An exothermic reaction set in and the temperature rose to 118° C. The temperature was maintained at 115° to 118° C. for 3 hours by additional heating. In this period, 4.6 (g) of ammonia were driven off.

The Mannich base obtained contained 6.4% of phenolic OH groups (including those of the salicylic acid) and had a hydrogen equivalent weight of 78.2.

(15) Process (c)

136 g of m-xylylenediamine were placed in a three-necked flask fitted with a stirrer, reflux condenser and thermometer and 94 g of phenol followed by 23.4 g of hexamethylenetetramine were added, with stirring. Then a nitrogen current was passed over the reaction mixture, and this current was passed through the cooler into a gas header with 7 N sulphuric acid in order to absorb the ammonia. Then the mixture was heated to 140° C. over one hour and kept at this temperature for 4 hours. It was then cooled to 100° C. and 136 g of m-xylylenediamine and 55 g of resorcinol were added. The resorcinol was dissolved within 15 minutes by stirring at 90° to 100° C., then the mixture was heated to 115° C. and kept at this temperature for three hours. A total of 17 g of ammonia were split off.

The Mannich base obtained contained 7.7% of phenolic OH groups and had a hydrogen equivalent weight of 67.6.

Examples 16 and 17—Process (b)

(16a) 820 g of formaldehyde (36.5 percent strength) (10 moles) were dropped within 1 hour to 730 g of t-butylamine (10 moles) while stirring and keeping the exothermic reaction at 40° C. by cooling. The mixture was kept for 30 minutes at this temperature, cooled to room temperature and then put in a separatory funnel. After the phases had completely separated, at first the water was discharged and 814 g (95.5 percent of the theory) of N-methylene-t-butylamine were obtained as the upper phase.

(b) 650 g of phenol (6.91 moles) were added within 15 minutes to 691 g of N-methylene-t-butylamine (8.13 moles) and heated to 50° C.; an exothermic reaction occurred and the temperature was kept at 50° C. by cooling. After the generation of heat had almost terminated, the mixture was stirred for 2 hours at 50° to 55° C.; then it was heated to 80° C. and kept at this temperature for another hour. Then reduced pressure of 40 to 65 mbar was applied and kept for 30 minutes. Residual amounts of water and excess amounts of amine were thus distilled off. The yield was 1268 g (94.6 percent of the theory) and the viscosity of the Mannich base was at 80 mPa.s at 25° C.; hydrogen equivalent 165; content of phenolic hydroxyl 8.76 percent.

(c) 136 g of meta-xylylene diamine (1 mole) were added under stirring to 165 g of t-butylamine-mannich base (1 mole) and heated to 120° C. t-Butylamine distilled off (temperature at which a stable phase of condensate was formed from the vapor phase 43° C.) which was condensed in an intensive cooler, cooled to 0° C. The temperature of the mixture was increased within 1 hour from 120° to 140° C. and the mixture was kept at this temperature for a further hour, until the distillation was completely terminated. 66 g of t-butylamine (90 percent of the theory) were obtained as a distillate. The mannich base (viscosity 35,000 mPa.s at 25° C.) had a phenolic hydroxy group content of 6.34 percent and a hydrogen equivalent of 76.

(17a) 160 g of phenol (1.7 moles) were added to 174 g of t-amylamine (2 moles) while stirring and 164 g of formaldehyde (36.5 percent strength) were dropwise added thereto at 40° C. within one hour. The mixture was then stirred for 5 hours at 40° C., cooled down to room temperature and placed in a separatory funnel. The phases were separated and the resin phase was kept for 1 hour at 80° C. at a reduced pressure of 40 to 65 mbar, thus distilling off residual amounts of water and excess amine. 320 g of the Mannich base (about 90 percent of the theory) having a viscosity of 97 mPa.s were obtained. The product contained 8.08 percent of hydroxy groups and the hydrogen equivalent was 179.

(b) 136 g of meta-xylylene diamine (1 mole) were added to 179 g of the t-amylamine-mannich base (1 mole) and heated to 120° C. t-Amylamine was distilled off (temperature at which a stable phase of condensate was formed from the vapor phase 75° C.). The temperature of the mixture was increased within one hour from 120° to 140° C. and the mixture was kept at this temperature for a further hour, until the distillation was completely terminated. 78 g of t-amylamine (89.7 percent of the theory) were obtained as a distillate. The mannich base having a relatively low viscosity had a content of phenolic hydroxy groups of 6.34 percent and a hydrogen equivalent of 76.

(II) Preparation of coatings

Example 18 and Comparison Tests 19aV to 19cV

In order to produce coatings starting with the Mannich base according to Example 2, curing agents were used having various concentrations, i.e. containing varying amounts of phenolic OH groups:

(18) Mannich base according to Example 2

Phenolic hydroxy content: 6.95%
Hydrogen equivalent weight: 80.7.

(19aV) Comparison

Mannich base according to Example 2, diluted with 10% of m-xylylenediamine,
Phenolic hydroxy content: 6.26%
Hydrogen equivalent weight: 71.2.

(19bV) Comparison

Mannich base according to Example 2, diluted with 20% of m-xylylenediamine
Phenolic hydroxy content: 5.56%
Hydrogen equivalent weight: 63.4.

(19cV) Comparison

The results are given in the tables which follow. d represents days.

| Coating with | Example 18 | Test of resistance to chemicals | | |
|---|---|---|---|---|
| | | Comparison Example 19aV | Comparison Example 19bV | Comparison Example 19cV |
| Acetic acid 5% | little effect on film after 14d, greater effect on film after 60d | little effect on film after 10d, greater effect on film after 35d | little effect on film after 6d, film destroyed after 20d | little effect on film after 3d, film destroyed after 10d |
| Lactic acid 5% | little effect on film after 30d, greater effect on film after 80d | little effect on film after 20d, greater effect on film after 60d | little effect on film after 7d, film destroyed after 30d | little effect on film after 3d, film destroyed after 20d |
| Sulphuric acid 78% | immediate surface discoloration, after 30d formation of a protective oxide layer | immediate surface discoloration, after 25d formation of a protective oxide layer | immediate surface discoloration, after 20d formation of a protective oxide layer | immediate surface discoloration, after 20d formation of a protective oxide layer |
| Nitric acid 20% | surface discoloration after 7d, no further effect on film | surface discoloration after 7d, no further effect on film | surface discoloration after 6d, no further effect on film | surface discoloration after 5d, no further effect on film |
| Phosphoric acid 40% | surface discoloration after 7d, little effect on film after 20d, greater effect after 60d | surface discoloration after 7d, little effect on film after 15d, greater effect after 50d | surface discoloration after 5d, little effect on film after 10d, greater effect after 40d | surface discoloration after 4d, little effect on film after 7d, greater effect after 35d |
| Methyl ethyl ketone | slight effect on film after 2d, considerable effect after 14d | slight effect on film after 2d, considerable effect after 10d | slight effect on film after 2d, considerable effect after 7d | slight effect on film after 1d, considerable effect after 4d |
| Denatured ethyl alcohol, 96% | no effect on film within 90d | no effect on film within 90d | film softens after 40d | film softens after 25d |

Mannich base according to Example 2, diluted with 30% of m-xylylenediamine,
Phenolic hydroxy content: 4.87%
Hydrogen equivalent weight: 57.2.

100 T of a low molecular weight diphenylolpropane diglycidyl ether having a viscosity of about 9000 mPa.s (25° C.) and an epoxy equivalent weight of 185 were mixed with 8 T of rutile-type titanium dioxide and 8 T of iron oxide black, with the aid of a 1 T of a urea-formaldehyde resin etherified with isobutanol and 0.5 T of a silicone oil suitable for use as a flow agent.

Coatings consisting of the pigmented epoxy resin and the Mannich base according to Example 2 or solutions thereof in m-xylylenediamine as curing agent were applied to degreased and scoured sheets of iron (8×5×0.2 cm), the epoxy resin and curing agent being mixed together in accordance with the epoxy equivalent weight and hydrogen equivalent weight. To improve the mixing, the curing agents were diluted, if necessary, with alkyl alcohol or other suitable alcohols to about 5000 mPa.s (25° C.). The coating was applied in three applications all over the sheets of iron, at intervals of 24 hours, to produce a layer thickness of about 500 μm.

These coated sheets were left to harden for 14 days and then stored in various media so as to test their resistance to chemicals. The changes in the films were observed daily.

The comparison tests clearly show the deterioration in the resistance to chemicals, particularly organic acids and alcohol, when curing agents containing less than 6.3% by weight of phenolic hydroxy are used.

Examples 20 to 22 and 23aV and 23bV

In another series of tests, the following phenol-free Mannich bases were tested for their resistance to chemicals under the same conditions:

(20) Mannich base according to Example 1, containing 6.91% of phenolic hydroxy and having a hydrogen equivalent weight of 80.7.

(21) Mannich base according to Example 6, containing 6.59% of phenolic hydroxy and having a hydrogen equivalent weight of 86.

(22) Mannich base according to Example 16c containing 6.34% of phenolic hydroxy and having a hydrogen equivalent weight of 76.

(23aV) Comparison: Mannich base according to Comparison Example 10V containing 9.32% of phenolic hydroxy and having a hydrogen eqivalent weight of 53.3.

(23bV) Comparison: Mannich base according to Comparison Example 11V containing 6.58% of phenolic hydroxy and having a hydrogen equivalent weight of 53.

| Coating with | Example 20 | Example 21 | Test of resistance to chemicals Example 22 | Comparison Example 23aV | Comparison Example 23bV |
|---|---|---|---|---|---|
| Acetic acid 5% | little effect on film after 13d, greater effect after 60d | little effect on film after 14d, greater effect after 65d | little effect on film after 16d, greater effect after 70d | considerable effect on film after 3d, film destroyed after 15d | considerable effect on film after 3d, film destroyed after 16d |
| Lactic acid | little effect on | little effect on | little effect on | considerable effect | considerable effect |

-continued

| | Test of resistance to chemicals | | | | |
|---|---|---|---|---|---|
| Coating with | Example 20 | Example 21 | Example 22 | Comparison Example 23aV | Comparison Example 23bV |
| 5% | film after 30d, greater effect after 75d | film after 25d, greater effect after 70d | film after 36d, greater effect after 75d | on film after 7d, film destroyed after 25d | on film after 8d, film destroyed after 28d |
| Sulphuric acid 78% | immediate surface discoloration, after 35d formation of a protective oxide layer | immediate surface discoloration, after 30d formation of a protective oxide layer | immediate surface discoloration, after 30d formation of a protective oxide layer | immediate surface discoloration, after 20d formation of a protective oxide layer | immediate surface discoloration, after 20d formation of a protective oxide layer |
| Nitric acid 20% | surface discoloration after 6d, no further effect on film | surface discoloration after 7d, no further effect on film | surface discoloration after 8d, no further effect on film | surface discoloration after 5d, no further effect on film | surface discoloration after 6d, no further effect on film |
| Phosphoric acid 40% | surface discoloration after 8d, little effect on film after 20d, greater effect after 60d | surface discoloration after 6d, little effect on film after 15d, greater effect after 50d | surface discoloration after 8d, little effect on film after 18d, greater effect after 60d | surface discoloration after 6d, little effect after 10d, greater effect after 40d | surface discoloration after 7d, little effect on film after 7d, greater effect after 35d |
| Methyl ethyl ketone | little effect on film after 2d, considerable effect after 12d | little effect on film after 2d, considerable effect after 13d | little effect on film after 2d, considerable effect after 14d | little effect on film after 2d, considerable effect after 6d | little effect on film after 1d, considerable effect after 5d |
| Denatured ethyl alcohol, 96% | no effect on film within 90d | no effect on film within 90d | no effect on film within 90d | film softens after 50d | film softens after 35d |

Comparison tests 20 to 23 bV show that an adequate resistance to chemicals, particularly to organic acids, requires not only a content of phenolic hydroxy of more than 6.3% but also the use of xylylene diamine or the hydrogenation product thereof as an essential basic partner of the Mannich base. Tests with the Mannich base according to Comparison Example 5V also demonstrated a lower resistance to chemicals than was shown by the samples produced with Mannich bases obtained from xylylene diamine.

Examples 24 to 26

In this series of tests, Mannich bases of different structures were tested for their resistance to chemicals.

(24) Mannich base according to Example 4, containing 6.83% of phenolic hydroxy and having a hydrogen equivalent weight of 82.7,

(25) Mannich base according to Example 3 containing 6.59% of phenolic hydroxy and having a hydrogen equivalent weight of 85.3,

(26) Mannich base according to Example 7, containing 6.45% of phenolic hydroxy and having a hydrogen equivalent weight of 77.3.

As can be seen from the table which follows, there is no difference in the chemical resistance of the Mannich base obtained from m-xylylenediamine and that obtained from bis-(aminomethyl)-cyclohexane, whereas the methyl substituent does cause a slight deterioration (test 25).

| | Test of resistance to chemicals | | |
|---|---|---|---|
| Coating with | Test 24 | 25 | 26 |
| Acetic acid 5% | little effect on film after 15d, greater effect after 60d | little effect on film after 16d, greater effect after 65d | little effect on film after 10d, greater effect after 40d |
| Lactic acid 5% | little effect on film after 28d, greater effect after 70d | little effect on film after 25d, greater effect after 75d | little effect on film after 12d, greater effect after 55d |
| Sulphuric acid 78% | immediate surface discoloration, after 30d formation of a protective oxide layer | immediate surface discoloration, after 35d formation of a protective oxide layer | immediate surface discoloration, after 25d formation of a protective oxide layer |
| Nitric acid 20% | surface discoloration after 6d, no further effect on film | surface discoloration after 6d, no further effect on film | surface discoloration after 4d, no further effect on film |
| Phosphoric acid 40% | surface discoloration after 7d, little effect on film after 18d, greater effect after 55d | surface discoloration after 6d, little effect on film after 16d, greater effect after 45d | surface discoloration after 5d, little effect on film after 8d, greater effect after 30d |
| Methyl ethyl ketone | slight effect on film after 2d, considerable effect after 13d | slight effect on film after 2d, considerable effect after 17d | slight effect on film after 2d, considerable effect after 8d |
| Denatured ethyl alcohol, 96% | no effect on film within 90d | no effect on film within 90d | softening of film after 60d |

Formula Sheet
A
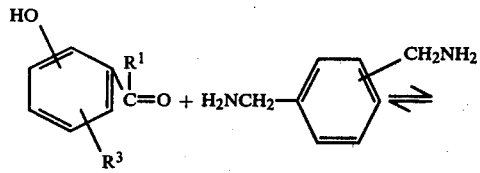 (1)
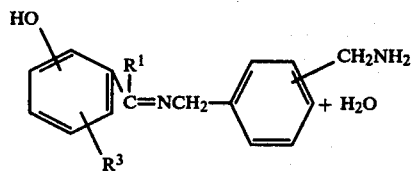 (2)
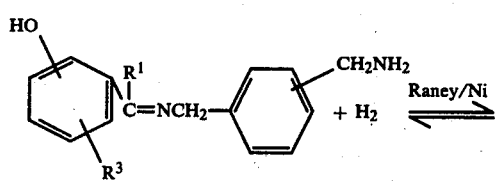 (3)
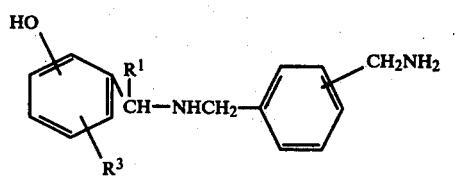 (4)
B
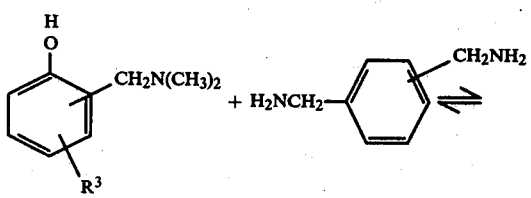 (5)
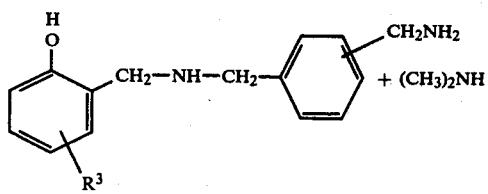 (6)
C
(CH$_2$)$_6$N$_4$ + (7)
-continued
Formula Sheet
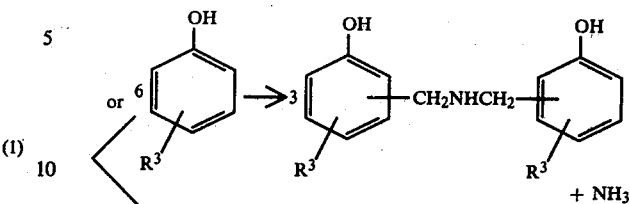
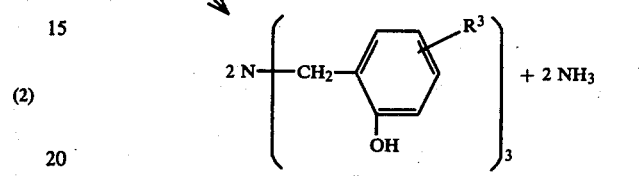 (8)
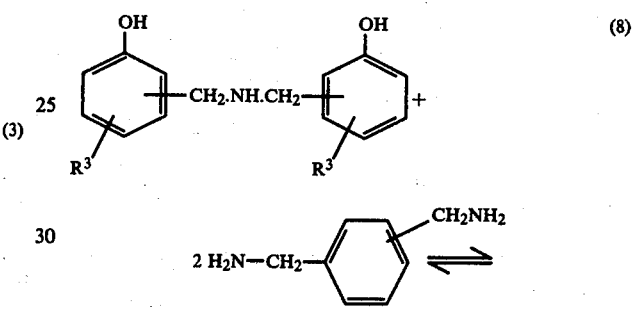
(D)
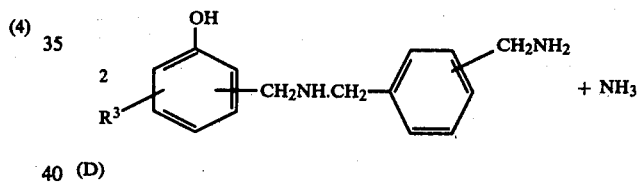
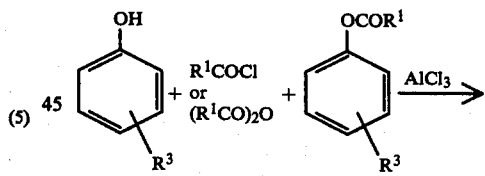
 (9)
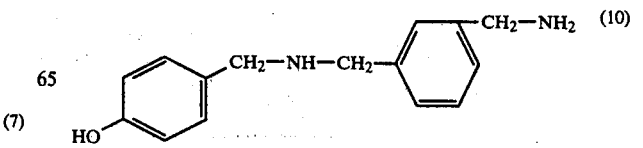 (10)

-continued
Formula Sheet

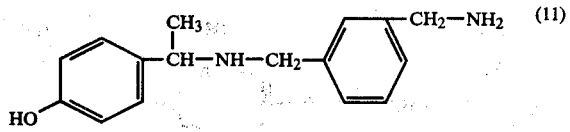

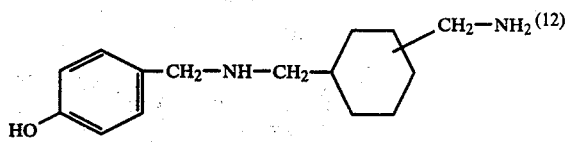

V (Comparison) 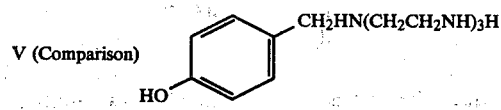

What we claim is:

1. A process for the preparation of molded bodies and coatings which comprises reacting at least one epoxy compound containing more than one 1,2-epoxy group per molecule alone or in combination with at least one mono-epoxide, with at least one substituted amine of formula

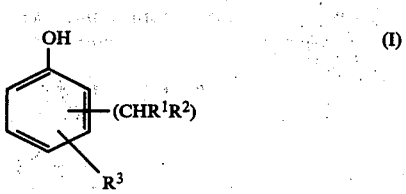

being free from other phenols and in which $R^1$ is hydrogen or methyl, $R^2$ is a radical of at least one of formulae

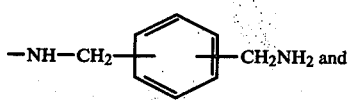

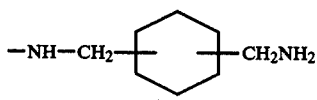

and $R^3$ is hydrogen, a hydroxy group, a carboxylic group or methyl, which amine has a content of phenolic OH— groups of at least 6.3% by weight and is reacted in an amount being at least equivalent to the epoxy groups in the epoxy resin and at most in an excess of up to 50 mol%, said amine (I) having been obtained by reaction of (A) a substance selected from the group consisting of least one xylylenediamine, and hydrogenation product thereof in the form of bis-(aminomethyl)-cyclohexanes according to one of the following processes with (Ba) a hydroxybenzaldehyde or a hydroxyacetophenone in a first step to form a Schiff's base and followed by a hydrogenation of said base in a second step to form a compound of formula (I), (Bb) a dimethylaminomethylphenol or with the corresponding cresol derivative or with at least one Mannich base, each of them being free from other phenols but derived from at least one phenol, formaldehyde and such primary monoamines, the aliphatic α-carbon atom of which is bound to at least two aliphatic carbon atoms of hydrocarbon groups, and/or substitution products thereof, the substituent of which is inert towards the reaction, splitting off and therefore substituting completely or to a large extent the dimethylamine group or the primary monoamine component of the Mannich base by the component (A) to yield a compound of formula (I), and (Bc) at least one phenol-hexamethylenetetramine condensation product of at least one of the formula

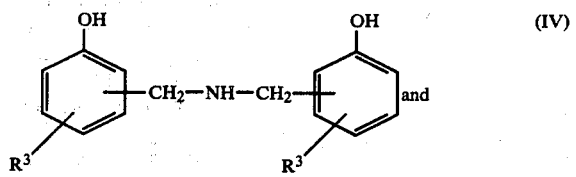

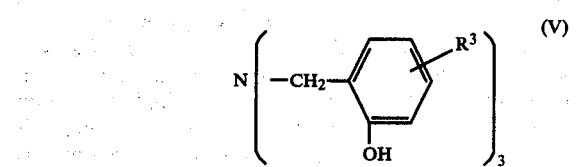

said products being free from other phenols, splitting off and therefore substituting ammonia by component (A) to form a compound of formula (I).

2. A process as claimed in claim 1, wherein the substitution reaction of component (A) in the steps (Bb) and (Bc) is effected at a temperature of from 100° to 200° C.

3. A process as claimed in claim 2, wherein the temperature is in the range of from 120° to 160° C.

4. A process as claimed in claim 1, wherein the substituted amine (I) is used as a hardener per se or in solution and has a content of phenolic OH-groups of at least 6.7% by weight.

5. A process as claimed in claim 1, wherein the reaction of the epoxy compounds with the amines of formula (I) is performed at a temperature of at least −5° C.

6. A process for the preparation of molded bodies and coatings which comprises reacting at least one epoxy compound containing more than one 1,2-epoxy group per molecule alone or in combination with at least one mono-epoxide, with at least one substituted amine of formula

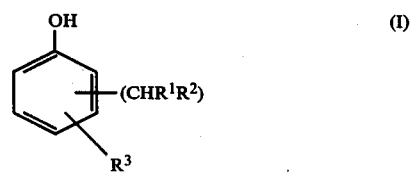

being free from other phenols and in which $R^1$ is hydrogen or methyl, $R^2$ is a radical of at least one of formulae

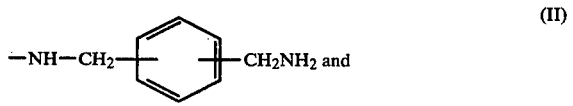

-continued

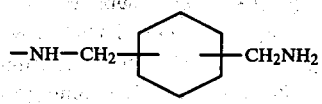
(III)

and R[3] is hydrogen, a hydroxy group, a carboxylic group or methyl, said amine (I) having been obtained by reaction of (A) a substance selected from the group consisting of at least one xylylenediamine, and hydrogenation product thereof in the form of bis-(aminomethyl)-cyclohexanes according to one of the following processes with (Ba) a hydroxybenzaldehyde or a hydroxyacetophenone in a first step to form a Schiff's base and followed by hydrogenation of said base in a second step at 50 to 100 bar $H_2$ to form the compound of formula (I), (Bb) a dimethylaminomethylphenol or with the corresponding cresol derivative or with at least one Mannich base, each of them being free from other phenols but derived from at least one phenol, formaldehyde and such primary monoamines, the aliphatic α-carbon atom of which is bound to at least two aliphatic carbon atoms of hydrocarbon groups, and/or substitution products thereof, the substituent of which is inert towards the reaction, splitting off and therefore substituting completely or to a large extent the dimethylamine group or the primary monoamine component of the Mannich base by the component (A) at a temperature of from 100° to 200° C. to yield a compound of formula (I), and (Bc) at least one phenolhexamethylenetetramine condensation product of a molar ratio of 3:1 to 6:1 of at least one of the formulae

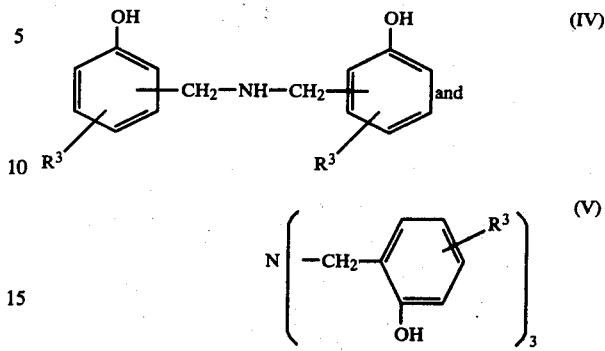

said products being free from other phenols, splitting off and therefore substituting ammonia by component (A) at a temperature of from 100° to 200° C. to form a compound of formula (I) wherein the amines of formula (I) are reacted in an amount being at least equivalent to the epoxy groups in the epoxy resin and at most in an excess of up to 50 mol-%, wherein said amine (I) is used as a hardener per se or in solution and has a content of phenolic OH-groups of at least 6.7% by weight and the reaction of the epoxy compounds with the amines of formula (I) is performed at a temperature of at least −5° C.

* * * * *